United States Patent [19]

Iohara et al.

[11] Patent Number: 4,609,710
[45] Date of Patent: Sep. 2, 1986

[54] UNDRAWN POLYESTER YARN AND PROCESS FOR MANUFACTURING

[75] Inventors: Kohichi Iohara; Michikage Matsui, both of Ibaraki, Japan

[73] Assignee: Teijin Limited, Osaka, Japan

[21] Appl. No.: 563,003

[22] Filed: Dec. 19, 1983

Related U.S. Application Data

[63] Continuation of Ser. No. 299,064, Sep. 3, 1981, abandoned.

[30] Foreign Application Priority Data

Sep. 3, 1980 [JP] Japan ................. 55-121211

[51] Int. Cl.[4] .................................. C08L 67/02
[52] U.S. Cl. ........................ 525/176; 525/177; 264/211
[58] Field of Search ........... 260/DIG. 23; 264/211; 428/395; 525/176, 177

[56] References Cited

U.S. PATENT DOCUMENTS

| | | | |
|---|---|---|---|
| 2,917,779 | 12/1959 | Hurzke | 260/DIG. 23 |
| 3,322,854 | 5/1967 | Yasui | 525/177 |
| 3,591,659 | 7/1971 | Brinkmann | 525/176 |
| 4,104,261 | 8/1978 | Magosch | 525/176 |
| 4,251,644 | 2/1981 | Joffrion | 525/176 |
| 4,267,286 | 5/1981 | Campbell | 525/176 |

FOREIGN PATENT DOCUMENTS

| | | | |
|---|---|---|---|
| 47-15916 | 5/1972 | Japan | 525/177 |
| 49-034744 | 9/1974 | Japan | 525/177 |
| 1183086 | 3/1970 | United Kingdom | 525/408 |

*Primary Examiner*—John C. Bleutge
*Assistant Examiner*—Patricia Short
*Attorney, Agent, or Firm*—Burgess, Ryan & Wayne

[57] ABSTRACT

An undrawn polyester yarn comprising 0.2 to 10% by weight of a polymer having a recurring unit structure represented by the following formula (1):

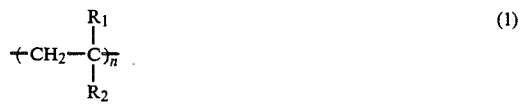

wherein $R_1$ and $R_2$ stand for substituents consisting of optional atoms selected from C, H, N, O, S, P and halogen atoms, with the proviso that the sum of the molecular weights of $R_1$ and $R_2$ is equal to or more than 40, and n is a positive integer, and having a molecular weight equal to or more than 1000, the elongation increase ratio (I) of the undrawn polyester yarn, represented by the following formula (2), being equal to or more than 8%:

$$I(\%) = \left(\frac{EL_b}{EL_o} - 1\right) \times 100 \qquad (2)$$

wherein $EL_b$ stands for the residual elongation (%) of the undrawn yarn and $EL_o$ stands for the residual elongation (%) of a corresponding undrawn polyester yarn substantially free of the polymer represented by the formula (1).

6 Claims, 1 Drawing Figure

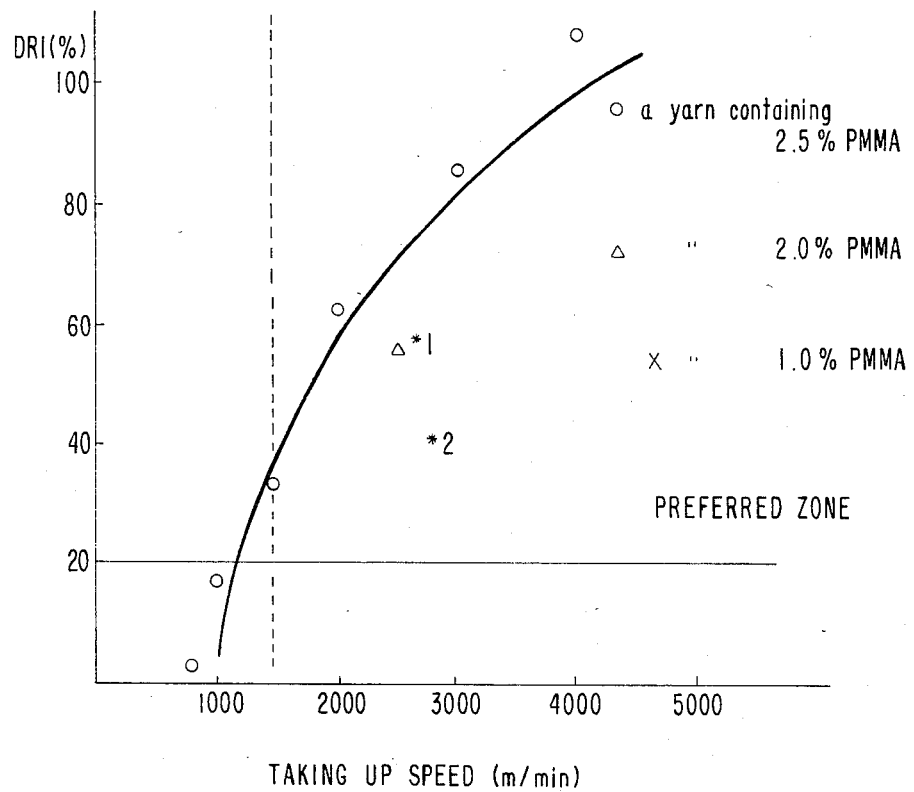
NOTE: *1, *2
THESE TWO DATA ARE DISCLOSED IN THE ORIGINAL SPECIFICATION.

UNDRAWN POLYESTER YARN AND PROCESS FOR MANUFACTURING

This is a continuation of application Ser. No. 299,064, filed Sept. 3, 1981, now abandoned.

BRIEF DESCRIPTION OF THE INVENTION

The present invention relates to a novel undrawn polyester yarn and a process for manufacturing the same. More particularly, the present invention provides an undrawn polyester yarn, the productivity of which is enhanced by adding a certain specific polymer to a polyester, and a process for manufacturing such an undrawn polyester yarn.

BACKGROUND OF THE INVENTION

A method of increasing the amount of a melt extruded from a spinneret in melt-spinning for production of polyester fibers is very effective for increasing the output or productivity. At present, the demand for fibers having a finer denier is increasing. However, if the speeds of taking up the spun yarns are the same, the productivity of a fine yarn is lower than that of a thick yarn. The above-described method is very desirable for overcoming the low productivity which has been unavoidable when producing a fine yarn, and for increasing the productivity and reducing the yarn-manufacturing cost. For this purpose, there can be mentioned a method in which the speed of taking up a spun yarn is increased and the amount of a melt extruded from a spinneret is thereby increased. According to this method, however, since the take-up speed is high, the molecular orientation of the spun yarn is generally enhanced, resulting in reduction of the residual elongation of the obtained undrawn yarn. Therefore, at the subsequent drawing or draw texturing step, the draw ratio should naturally be decreased. Accordingly, although the amount of the extruded melt is increased because of the increase of the take-up speed during a melt spinning step, the effect which is less than that previously expected can only be obtained due to the reduction of the draw ratio during a drawing step. More specifically, in melt-spinning of a polyester, when the denier of the intended yarn obtained through a drawing step is denoted by de and the draw ratio in the drawing step is denoted by DR, the denier of the spun yarn is expressed by de ×DR. If the speed (m/min) of taking up the spun yarn is denoted by V, the extrusion amount Q (g/min) of the molten polymer is expressed by the following formula:

$$Q = \frac{1}{9000} \, de \times V \times DR$$

Accordingly, if the denier of the drawn yarn is constant, the extrusion amount Q is proportional to the product of the take-up speed V multiplied by the draw ratio DR. If the draw ratio DR is constant regardless of the take-up speed V, the extrusion amount Q is proportionally increased as the take-up speed V is increased. However, in fact, as described above, the draw ratio DR is decreased as the take-up speed is increased, and therefore, the extrusion amount does not increase as it is expected.

This problem will be solved by controlling increase of the molecular orientation of the spun yarn even if the speed of taking up the spun yarn is increased. As such a means, there has been considered a method in which a heated spinning chimney is disposed just below the spinneret, and the stream of the polymer extrudate is gradually cooled and solidified. This method, however, is defective in that a specially designed heating apparatus should be disposed and control of the process of cooling the spun yarn is very difficult.

Separately, there has been proposed a method in which a chain branching agent such as pentaerythritol is copolymerized as a third component with a polyester and the extrusion amount and draw ratio are increased to improve the productivity (see Japanese Patent Application Laid-Open Specification No. 292/78). This method, however, is still disadvantageous in that special polymerization conditions must be adopted; also the spinning condition is often degraded and the physical properties of the obtained yarn are adversely affected.

The present inventors have carefully done research with a view to overcoming the foregoing defects involved in the conventional methods, and they have found that when a polymer having a certain specific recurring unit structure is added to a polyester, even if the take-up speed is increased, the molecular orientation is not enhanced, whereby an undrawn polyester yarn having a high residual elongation is obtained. As a result, drawing at a high draw ratio becomes possible and productivity is increased. The present inventors have now completed the present invention based on this finding.

SUMMARY OF THE INVENTION

More specifically, in accordance with one fundamental aspect of the present invention, there is provided an undrawn polyester yarn which comprises 0.2 to 10% by weight of a polymer (exclusive of a styrene type polymer) having a recurring unit structure represented by the following formula (1):

$$\begin{array}{c} R_1 \\ | \\ \text{\textthreequartersemdash}CH_2\text{\textemdash}C\!\!\!\text{\textemdash}\!\!\!\text{\textthreequartersemdash}_n \\ | \\ R_2 \end{array} \qquad (1)$$

wherein $R_1$ and $R_2$ stand for substituents consisting of optional atoms selected from C, H, N, O, S, P and halogen atoms, with the proviso that the sum of the molecular weights of $R_1$ and $R_2$ is at least 40, and n is a positive integer, and having a molecular weight of at least 1,000, the elongation increase ratio (I) of said undrawn polyester yarn, represented by the following formula (2), being at least 8%:

$$I\,(\%) = \left(\frac{EL_b}{EL_o} - 1\right) \times 100 \qquad (2)$$

wherein $EL_b$ stands for the residual elongation (%) of said undrawn yarn and $EL_o$ stands for the residual elongation (%) of a corresponding undrawn polyester yarn substantially free of said polymer represented by the formula (1).

In accordance with another fundamental aspect of the present invention, there is provided a process for manufacturing an undrawn polyester yarn, which comprises; melting a polyester comprising 0.2 to 10% by weight of a polymer having a structure represented by the above formula (1), spinning the melt from a spinneret; and taking up the spun yarn at a speed of 850 to 8000 m/min.

DETAILED DESCRIPTION OF THE INVENTION

The polyester that is used in the present invention is a polyester having a fiber-forming property, which comprises as the main acid component, an aromatic dicarboxylic acid. For example, there can be mentioned polyethylene terephthalate, polytetramethylene terephthalate, polycyclohexanedimethylene terephthalate and polyethylene-2, 6-naphthalene dicarboxylate. These polyesters may be copolymers copolymerized with either another alcohol or another carboxylic acid such as isophthalic acid or 5-sodium sulfoisophthalate as a third component. Furthermore, mixtures of two or more of these polyesters may be used. Among these polyesters, polyethylene terephthalate is especially preferred.

These polyesters may comprise additives such as a delustering agent, a thermal stabilizer, an ultraviolet absorber, an antistatic agent, a terminating agent and a fluorescent whitening agent, if necessary.

It is preferable that these polyesters have an intrinsic viscosity of between 0.5 and 1.1 determined at a temperature of 25° C. in 0-chloro phenol solution having a concentration of 8% taking into consideration their ability to be spun and their yarn forming properties.

The polymer that is added to the polyester should have recurring units substantially represented by the above formula (1), and it is preferred that $R_1$ and $R_2$ constituting side chains be bulky to some extent.

As typical instances, there can be mentioned polymethacrylates and derivatives thereof, polyacrylates and derivatives thereof, poly(4-methyl-1-pentene), poly-octadecene-1, and poly(vinyl benzyl) and derivatives thereof. Poly(methyl methacrylate) and poly(4-methyl-1-pentene) are especially preferred. If the sum of the molecular weights of $R_1$ and $R_2$ is equal to or more than 40, the modifying effect of improving the residual elongation of the undrawn yarn is sufficiently prominent. Contrary to this, if the sum of the molecular weights of $R_1$ and $R_2$ is smaller than 40, a modifying effect can scarcely be attained.

This polymer may be a mixture of polymers composed mainly of recurring units represented by the formula (1) or a copolymer composed mainly of recurring units represented by the formula (1). It is indispensable that the average molecular weight of the polymer should be equal to or more than 1000. In the case of a prepolymer or polymer having a molecular weight of at least 1000, an effect of enhancing the elongation of the undrawn yarn can be attained. Contrary to this, if the molecular weight is lower than 1000, because of the low molecular weight, function changing the molecular movement of the polyester which will be explained later in detail cannot be manifested, and accordingly, the effect of increasing the residual elongation cannot fully be attained. The polymer is added to the polyester in an amount of 0.2 to 10% by weight, preferably 0.5 to 6% by weight. If the amount of the polymer is less than 0.2%, the intended effect of increasing the residual elongation according to the present invention cannot be attained. If the amount of the polymer exceeds 10%, filament breakage and entanglement about take-up rollers often occur during the spinning step, and therefore, the spinning condition is degraded, and furthermore, physical properties such as strength and elongation are lessened in the obtained yarn.

An optional method may be adopted for adding the polymer comprising recurring units represented by the formula (1) to the polyester. For example, the addition may be effected during the polymerization process for forming the polyester. Furthermore, there may be adopted a method in which the polymer is melt-mixed with the polyester and the mixture is extruded, cooled and formed into chips. Moreover, there may be adopted a method in which both the polymers are mixed in the form of chips, and then, the mixture is melt-spun.

At the step of the addition of the polymer, in order to enhance the degree of kneading, it is preferred that a screw type melt extruder be used. Whatever method may be adopted for the addition, it is necessary to make sure that mixing is performed sufficiently and the additive polymer is finely and uniformly dispersed in the polyester. In the case where kneading is insufficient and the additive polymer is dispersed in the polyester in such a condition as in the form of relatively large sized islands, i.e., the diameter of which is larger than 1 micron, in the sea, the effect of improving the residual elongation is not fully attained, and an undesirable phenomenon such as fibrillation occurs.

In the present invention, the molecules of the additive polymer, dispersed in the polyester, will probably act as members having a function similar to that of "rolls" used in a machine and will cause the delayed deformation of the polyester component. The detailed mechanism will be explained later.

In obtaining the undrawn polyester yarn of the present invention, it is important that the speed of taking up the spun yarn should be between 850 and 8000 m/min, preferably between 1500 and 8000 m/min. If the take-up speed is too low, the molecular chain of the yarn being spun is scarcely oriented and the additive polymer fails to act as the above-mentioned rolls, and therefore, the effect of improving the residual elongation of the spun undrawn yarn is not attained. As the take-up speed is increased, the effect of the improving the residual elongation is increased. However, if the take-up speed is higher than 8000 m/min, adverse effects are caused by the addition of the polymer represented by the formula (1). That is, a weakening phenomenon, namely reduction of the strength and elongation of the spun undrawn yarn, occurs.

The undrawn polyester yarn obtained by performing the spinning and take-up operations in the abovementioned manner has a higher residual elongation than that of a corresponding undrawn polyester yarn obtained in the same manner except that the polymer having recurring units represented by the formula (1) is not added. More specifically, the elongation increase ratio (I) represented by the following formula is equal to or more than 8%, preferably equal to or more than 15%, in the obtained undrawn polyester yarn:

$$I(\%) = \left(\frac{EL_b}{EL_o} - 1\right) \times 100$$

wherein $EL_b$ stands for the residual elongation (%) of the undrawn yarn of the present invention, and $EL_o$ stands for the residual elongation (%) of a corresponding undrawn yarn substantially free of the polymer component represented by the formula (1).

Accordingly, the undrawn yarn of the present invention can be drawn at a higher draw ratio than the corresponding undrawn yarn free of the additive polymer. Furthermore, the undrawn yarn of the present invention is advantageous in that, when the residual elongation is increased, also the draw ratio improvement ratio (J) represented by the following formula is increased.

$$J(\%) = \left(\frac{DR_b}{DR_o} - 1\right) \times 100$$

wherein $DR_b$ stands for the draw ratio for the undrawn yarn of the present invention, and $DR_o$ stands for the draw ratio for a corresponding undrawn yarn free of the polymer represented by the formula (1) which gives the same residual elongation as that of a drawn yarn obtained by drawing the undrawn yarn of the present invention at the draw ratio of $DR_b$.

In melt-spinning of a polyester, the extrusion amount Q (g/min) of the molten polymer is generally expressed by the following formula:

$$Q = \frac{1}{9000} de \times V \times DR$$

wherein de stands for the denier of the intended drawn yarn, V (m/min) stands for the speed of taking up the spun yarn, and DR stands for the draw ratio used during a drawing step.

Accordingly, the fact that the draw ratio can be increased by J % under the condition of the same speed of taking up the spun yarn means that the extrusion amount Q at the spinning step can be increased by J % and the productivity throughout the spinning and drawing steps can proportionally be enhanced.

If the elongation increase ratio (I) is equal to or more than 8%, the draw ratio improvement ratio (J) is equal to or more than 5%, and the productivity is also enhanced by at least 5%.

The reason why a special effect of increasing the extrusion amount Q and accordingly enhancing the productivity can be attained in the present invention by addition of the polymer consisting essentially of recurring units represented by the formula (1) has not completely been elucidated. It is considered, however, that the effect is achieved by the combination of the following three matters. First is a chemical structural feature of the additive polymer created by the presence of bulky chains, such as a conformation that can hardly be elongated, and a low mobility. Second is the compatibility of the additive polymer with the polyester. Third is the mix characteristic of the additive polymer and the polymers, such as the dispersion state of the additive polymer in the blended state. The molecules of the additive polymer will probably act as "rolls" and cause delayed deformation of the polyester.

Presumably because of such mechanism if a polymer having a molecular weight lower than 1000 is added, substantial effect can scarcely be attained. Contrary to this, if the molecular weight exceeds 1000, the larger the molecular weight, the higher is the effect. However, if the molecular weight of the polymer is extremely large, the ability to be spun tends to be determined to some extent.

Another way of expressing the relationship between residual elongation of the undrawn yarn of the present invention and the residual elongation of a corresponding undrawn yarn substantially free of the polymer component represented by the formula (1), is by referring to the draw ratio increase ratio (DRI) which is represented by the following equation:

$$DRI(\%) = \left(\frac{E_{lb} + 100}{E_{lo} + 100} - 1\right) \times 100$$

where $E_{lb}$ is a residual elongation of polyester yarn containing PMMA and $E_{lo}$ is that of one not containing PMMA. DRI is equivalent to the elongation increase ratio (1) defined above.

BRIEF DESCRIPTION OF THE DRAWINGS

Referring to the drawing, the upper curve depicted by circles is a translation of the data in Table 3 relating to the yarn containing 2.5% PMMA. The middle and lower points depicted, respectively by a triangle and a cross represent data for the yarns containing, respectively, 2.0% and 1.0% PMMA, in which the data for the taking up speed of 2500 m/min. are described in Table 2 below.

As will be apparent from the foregoing description, according to the present invention, the productivity at the spinning step can drastically be improved in a very simple way, and therefore, the industrial significance of the present invention is very great.

EXAMPLES

The present invention will now be described in detail with reference to the following Examples.

EXAMPLE 1

Polyethylene terephthalate having an intrinsic viscosity of 0.64 (determined at a temperature of 25° C. in 0-chloro phenol solution having a concentration of 8%) and containing 0.5% of titanium oxide as a delustering agent was dried in the form of chips at 160° C. for 4 hours, and thereafter, chips of poly(methyl methacrylate) (Delpet 80N supplied by Asahi Kasei) were mixed with the dried polyester chips at various mixing ratios described in Table 1. The mixture was melt-blended at 300° C. by a screw type melt extruder having a diameter of 25 mm to disperse the polymethacrylate into the polyethylene terephthalate.

Then, the molten polymer was extruded from a spinneret having 24 nozzles, each having a diameter of 0.35 mm, and was cooled and solidified in a lateral-blow type spinning chimney located at a distance of between 10 and 110 cm below the spinneret by blowing air at room temperature at a speed rate of 12 m/min. The spun yarn was treated with an oiling agent and taken up at a take-up speed of 2500 m/min to obtain an undrawn yarn of 120 de. The ability to be spun and the strength, residual elongation and elongation increase ratio (I) of the obtained undrawn yarn are shown in Table 1.

TABLE 1

| Run No. | Mixing Ratio (%) of Polymethyl Methacrylate | Ability to be spun | Strength (g/de) | Residual Elongation (%) | Elongation Increase Ratio (I) (%) | Remarks |
| --- | --- | --- | --- | --- | --- | --- |
| 1 | 0 | good | 2.0 | 222 | 0 | comparison |
| 2 | 0.1 | good | 2.0 | 228 | 2.7 | " |
| 3 | 0.3 | good | 1.9 | 250 | 12.6 | embodiment of the present invention |
| 4 | 1 | good | 1.5 | 354 | 59.5 | embodiment of the present invention |
| 5 | 2 | good | 1.3 | 408 | 83.8 | embodiment of the present invention |
| 6 | 3 | good | 1.2 | 432 | 94.6 | embodiment of the present invention |
| 7 | 5 | good | 1.0 | 476 | 114.4 | embodiment of the present invention |
| 8 | 7 | slight filament breakage and entanglement about take-up rollers | 0.9 | 501 | 125.7 | embodiment of the present invention |
| 9 | 9 | slight filament breakage and entanglement about take-up rollers | 0.8 | 515 | 132.0 | embodiment of the present invention |
| 10 | 11 | spinning impossible because of frequent filament breakages | 0.6 | 492 | 121.6 | comparison |

In Run No. 1, the residual elongation was low because poly(methyl methacrylate) was not added. In Run No. 2, the residual elongation was low because the content of poly(methyl methacrylate) was low. On the other hand, in Run No. 10, since the mixing ratio of poly(methyl methacrylate) was too high, yarn breakages often took place and the ability to be spun was degraded. The residual elongation of the undrawn yarn increased with the increase of the mixing ratio of poly(methyl methacrylate), and the elongation increase ratio (I) became as high as 12 to 132% in the undrawn yarns of the present invention.

EXAMPLE 2

Undrawn yarns obtained in Runs Nos. 1 through 9 of Example 1 were drawn at a drawing speed of 300 m/min at a preheating temperature of 80° C. and a slit heater temperature of 180° C. The draw ratio (DR) providing a residual elongation of 25% in the obtained drawn yarn was determined.

The obtained results are shown in Table 2.

TABLE 2

| Undrawn Yarn | 25% DR | Draw Ratio Improvement Ratio (J) (%) |
| --- | --- | --- |
| Run No. 1 of Example 1 | 2.35 | 0 |
| Run No. 2 of Example 1 | 2.39 | 1.7 |
| Run No. 3 of Example 1 | 2.56 | 8.9 |
| Run No. 4 of Example 1 | 3.31 | 40.9 |
| Run No. 5 of Example 1 | 3.70 | 57.4 |
| Run No. 6 of Example 1 | 3.85 | 63.8 |
| Run No. 7 of Example 1 | 4.15 | 76.6 |
| Run No. 8 of Example 1 | 4.29 | 82.6 |
| Run No. 9 of Example 1 | 4.48 | 90.6 |

When the undrawn yarns of Runs Nos. 3 through 9 of Example 1 according to the present invention were used, the draw ratio improvement ratio (J), that is, the productivity improvement ratio, was as high as 9 to 91%.

EXAMPLE 3

To the same polyethylene terephthalate as used in Example 1 was added the same poly(methyl methacrylate) as used in Example 1 in an amount of 2.5% by weight. Melt extrusion was carried out under the same conditions as described in Example 1, and the spun yarn was taken up at various speeds described in Table 3 to obtain an undrawn yarn of 120 de. The ability to be spun and the strength, residual elongation and elongation increase ratio (I) of the obtained drawn yarn are shown in Table 3.

TABLE 3

| Run No. | Take-Up Speed (m/min) | Ability to be spun | Strength (g/de) | Residual Elongation (%) | Elongation Increase Ratio (I) (%) | Remarks |
| --- | --- | --- | --- | --- | --- | --- |
| 1 | 700 | good | 0.9 | 650 | 3.2 | comparison |
| 2 | 1000 | good | 1.0 | 600 | 20.0 | embodiment of the present invention |
| 3 | 1500 | good | 1.1 | 530 | 43.2 | embodiment of the present invention |
| 4 | 2000 | good | 1.1 | 470 | 62.1 | embodiment of the present invention |
| 5 | 3000 | good | 1.3 | 390 | 136.4 | embodiment of the present invention |
| 6 | 4000 | good | 1.5 | 330 | 230.0 | embodiment of the present invention |
| 7 | 5000 | good | 1.6 | 280 | 300.0 | embodiment of the |

TABLE 3-continued

| Run No. | Take-Up Speed (m/min) | Ability to be spun | Strength (g/de) | Residual Elongation (%) | Elongation Increase Ratio (I) (%) | Remarks |
| --- | --- | --- | --- | --- | --- | --- |
| 8 | 7500 | slight filament breakage | 1.7 | 200 | 344.0 | embodiment of the present invention |
| 9 | 8200 | spinning impossible because of frequent yarn breakages | — | — | — | comparison |

In Run No. 1, since the spinning take-up speed was too low, orientation was not caused in the molecular chain of the spun yarn, and no substantial effect of increasing the elongation was observed.

In Run No. 9, since the spinning take-up speed was too high, yarn breakages often occurred and the ability to be spun was extremely poor.

In Runs Nos. 2 through 8, the elongation increase ratio was elevated with increase of the take-up speed and was as high as 20 to 344%.

EXAMPLE 4

To the same polyethylene terephthalate as used in Example 1 was added 2.5% of polyethylene, polypropylene, polybutene, polypentene, poly(4-methyl-1-pentene) or polyacrylonitrile having a molecular weight of between about 30000 and about 60000, and the mixture was melted spun and taken up at 2500 m/min in the same manner as described in Example 1 to obtain an undrawn yarn of 120 de.

The ability to be spun and the residual elongation and elongation increase ratio (I) of the resulting undrawn yarn are shown in Table 4.

EXAMPLE 5

Poly(methyl methacrylate) having various molecular weights described in Table 5 was added in amount of 3% to a polyethylene terephthalate/5-sodium sulfoisophthalate copolymer (2.6 mole % of 5-sodium sulphoisophthalate was copolymerized) having an intrinsic viscosity of 0.60 (determined at a temperature of 25° C. in 0-chloro phenol solution having a concentration of 8%) and containing 0.5% of titanium oxide as a delustering agent, and the mixture was melt-spun and taken up under the same conditions as described in Example 1 except that the melting temperature was changed to 290° C., to obtain an undrawn yarn of 120 de. For comparison, the copolymer was similarly spun without addition of poly(methyl methacrylate).

The ability to be spun and the residual elongation and elongation increase ratio (I) of the resulting undrawn yarn are shown in Table 5.

TABLE 5

| Run No. | Molecular weight of poly(methyl methacrylate) | Ability to be Spun | Residual Elongation (%) | Elongation Increase Ratio (I) (%) | Remarks |
| --- | --- | --- | --- | --- | --- |
| 1 | 900 | good | 203 | 1.5 | comparison |
| 2 | 2000 | good | 218 | 8.9 | embodiment of the present invention |
| 3 | 8000 | good | 237 | 18.4 | embodiment of the present invention |
| 4 | 16000 | good | 262 | 31.0 | embodiment of the present invention |
| 5 | not added | good | 200 | 0 | comparison |

In Run No. 1, since the molecular weight of poly(methyl methacrylate) was lower than 1000, substantial effect of improving the residual elongation could scarcely be attained.

TABLE 4

| Run No. | Additive Polymer | Molecular Weight of $R_1 + R_2$ | Ability to be Spun | Strength (g/de) | Residual Elongation (%) | Elongation Increase Ratio (I) (%) | Remarks |
| --- | --- | --- | --- | --- | --- | --- | --- |
| 1 | polyethylene | 2 | good | 2.0 | 222 | 0 | comparison |
| 2 | polypropylene | 16 | good | 2.0 | 219 | −1.3 | " |
| 3 | polyacrylonitrile | 27 | good | 1.9 | 225 | 1.3 | " |
| 4 | polybutene | 30 | good | 1.9 | 238 | 7.2 | " |
| 5 | polypentene | 44 | good | 1.8 | 262 | 18.0 | embodiment of the present invention |
| 6 | poly(4-methyl-1-pentene) | 58 | good | 1.5 | 348 | 56.7 | embodiment of the present invention |

When the sum of the molecular weights of $R_1$ and $R_2$ was at least 40, a remarkable increase of the elongation was observed, and when this sum of the molecular weights was smaller than 40, this effect was drastically reduced.

We claim:

1. An undrawn polyester yarn prepared by a process which comprises:
   melting a polyester containing 0.2 to 10% by weight of a finely divided and uniformly dispersed polymer consisting of units represented by the following formula (1):

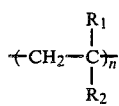

wherein $R_1$ and $R_2$ is each a substituent consisting of atoms selected from the group consisting of C, H and O atoms, with the proviso that $R_1$ and $R_2$ are not phenyl or substituted phenyl and that the sum of the molecular weight of $R_1$ and $R_2$ is at least 40, and n is a positive integer;

spinning the melt from a spinneret, and taking up the spun yarn at a speed of between 1500 and 8000 n/min.

2. An undrawn polyester yarn according to claim 1, wherein the content of the polymer represented by the formula (1) is 0.5 to 6% by weight.

3. An undrawn polyester yarn as set forth in claim 1, having an elongation increase ratio (I) of at least 15%.

4. An undrawn polyester yarn as set forth in claim 1, wherein in the formula (1), $R_1$ is H or an alkyl group having up to 5 carbon atoms and $R_2$ is a carboxylic acid ester represented by the formula

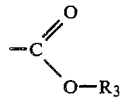

in which $R_3$ is an alkyl group having 1 to 5 carbon atoms.

5. An undrawn polyester yarn as set forth in claim 4, wherein $R_1$ stands for an alkyl group having up to 5 carbon atoms.

6. An undrawn polyester yarn as set forth in claim 5, wherein the polymer represented by the formula (1) is poly (methyl methacrylate).

* * * * *